US008766799B2

(12) United States Patent
Gray et al.

(10) Patent No.: US 8,766,799 B2
(45) Date of Patent: Jul. 1, 2014

(54) PROVIDING REMOTE ACCESS TO A WIRELESS COMMUNICATION DEVICE FOR CONTROLLING A DEVICE IN A HOUSING

(75) Inventors: Dean Russell Gray, Victoria (AU); Jason Yew Choo Choong, Mountain View, CA (US); Peter Atanasovski, San Francisco, CA (US); Niall Peter Mai, Victoria (AU)

(73) Assignee: Daintree Networks, Pty. Ltd., Scoresby, VIC (AU)

( * ) Notice: Subject to any disclaimer, the term of this patent is extended or adjusted under 35 U.S.C. 154(b) by 111 days.

(21) Appl. No.: 13/327,248

(22) Filed: Dec. 15, 2011

(65) Prior Publication Data

US 2013/0154831 A1      Jun. 20, 2013

(51) Int. Cl.
*G08B 21/00*     (2006.01)

(52) U.S. Cl.
USPC ................. 340/540; 340/539.1; 340/568.1

(58) Field of Classification Search
USPC ........... 340/540, 870.01, 870.26, 680, 545.1, 340/531, 539.1, 568.1, 572.1, 572.4, 669
See application file for complete search history.

(56) References Cited

U.S. PATENT DOCUMENTS

| | | | | |
|---|---|---|---|---|
| 4,905,433 A | * | 3/1990 | Miller | 174/504 |
| 2002/0015283 A1 | * | 2/2002 | Sallam | 361/681 |
| 2002/0076962 A1 | * | 6/2002 | Williams | 439/188 |
| 2002/0118284 A1 | * | 8/2002 | Newman et al. | 348/207.99 |
| 2008/0042907 A1 | | 2/2008 | Webb et al. | |
| 2008/0055147 A1 | | 3/2008 | Van | |
| 2010/0084854 A1 | | 4/2010 | Sathyanarayana et al. | |
| 2010/0207759 A1 | | 8/2010 | Sloan et al. | |
| 2010/0314226 A1 | * | 12/2010 | Patel et al. | 200/237 |
| 2011/0279300 A1 | | 11/2011 | Mosebrook | |
| 2012/0112654 A1 | | 5/2012 | Choong et al. | |

OTHER PUBLICATIONS

Adura Technologies, "Light Controller" online [retrieved on Oct. 4, 2012]. Retrieved from Internet electronic mail: http://aduratech.com/lighting-control-system/components/light-controller, 3 pages.
Notification of Transmittal of the International Search Report and the Written Opinion of the International Searching Authority for PCT/IB2012/002912 dated Jun. 17, 2013, 10 pages.

* cited by examiner

*Primary Examiner* — Daniel Previl
(74) *Attorney, Agent, or Firm* — Fish & Richardson P.C.

(57) ABSTRACT

Methods, systems, and apparatus for engaging a wireless communication device assembly to a housing. In one aspect including a wireless communication device assembly adapted to engage a knockout hole in a housing after removal of a knockout blank from the knockout hole, the wireless communication device assembly adapted to connect to the base unit and comprising: a housing engagement portion being of dimensions to at least substantially cover any uncovered portions of the knockout; a remote unit portion positioned outside of the housing when the wireless communication device assembly is engaged with the knockout hole, the remote unit portion having a remote unit surface distal from the housing engagement portion; and at least one of: an antenna device to receive wireless communications and a stimulating device that upon actuation of the stimulating device causes the base unit to perform one or more predefined operations.

20 Claims, 5 Drawing Sheets

PROVIDING REMOTE ACCESS TO A WIRELESS COMMUNICATION DEVICE FOR CONTROLLING A DEVICE IN A HOUSING

BACKGROUND

This specification relates to providing remote access to components and controls of a wireless communication device external to the housing in which the wireless communication device is enclosed.

With the proliferation of wireless technology, wireless control systems are increasingly being used in numerous and varied applications (e.g., wireless lighting control systems, power distributions systems, etc.). In many applications, the devices being controlled have (or are in) housings or enclosures. Wireless control systems for these applications often require that a wireless controller be placed within the device being controlled (e.g., within the housing or enclosure of the device being controlled). One such device is a lighting fixture, which typically has a ballast for a fluorescent lighting fixture, a driver for an LED lighting fixture, or a striker for an HID lighting fixture. Wirelessly enabling these types of devices generally involves introducing a wireless controller into the lighting fixture housing and then connecting the ballast/driver/striker to the wireless controller so the wireless control system can monitor and control the lighting fixture. In other applications, wirelessly enabling the lighting fixture involves integrating the wireless controller functionality into the ballast/driver/striker, in which case, the wireless controller is a wireless ballast/driver/striker. However, in either case, the device is within the housing.

By way of another example, the housing can be a junction box connected to a circuit or a fixture and the junction box has, within it, a wireless controller capable of turning the circuit on or off, or otherwise controlling the circuit via circuit wiring that passes through the junction box.

The operation and effectiveness of wireless controllers are dependent on numerous factors. For example, these factors include the ability to send and receive radio signals (e.g., wireless communications) despite being placed within a housing; to permit ready access to at least one button, switch or other stimulating device to cause the wireless controller to perform an action (e.g., to reset to a factory-default state or to change an operational setting); or to provide visual feedback indicating the state or health of the wireless controller (e.g., through an LED).

The operation and effectiveness of wireless controllers can be diminished by placing the wireless controllers within a housing. Some housings are made of metal (e.g., such as from an aluminum extrusion), and therefore substantially attenuate or sometimes completely prevent the propagation of radio signals into and out of the fixture. This, in turn, prevents the wireless control of devices within the fixture. In most cases, housings prevent access to stimulating devices on the wireless controller, as the wireless controller resides within the housing. Furthermore, any visual feedback mechanism available on the wireless controller is blocked in most housings, as the housings likely do not provide the necessary transparency to allow viewing of the visual feedback mechanism through the housing.

Another issue that must be considered when using wireless controllers in housings is the numerous types of housing designs available (e.g., lighting fixture types include 2×4 troffers, downlights, outdoor lights, parking garages lights, etc.). Because of the various types of housings, wireless controllers are typically designed to accommodate as many different housing types as possible and, as a result, it is difficult to provide the means to connect or extend antenna wires (or antenna jacks), stimulating devices and/or visual indicators from the wireless controller out of the housing so that they are readily accessible without the need to open or disassemble the housing, which can be challenging and time consuming.

SUMMARY

In general, one innovative aspect of the subject matter described in this specification can be embodied in methods that include the actions of engaging a plate assembly to a knockout hole in a housing after removal of a knockout blank from the knockout hole, the housing defining exterior surfaces and an interior region, where the plate assembly includes a coupling device adapted to engage the knockout hole; a plate coupled to the coupling device, the plate being of dimensions to at least substantially cover uncovered portions of the knockout hole when the coupling device is engaged with the knockout hole and to be disposed on an exterior surface of the housing and defining an exterior plate surface; and at least one of: a stimulating device positioned on the exterior plate surface, the stimulating device adapted to connect to a wireless communication device housed within the interior region and that upon actuation of the stimulating device, causes the wireless communication device to perform one or more predefined operations; and an antenna device positioned on the exterior plate surface, the antenna device adapted to connect to the wireless communication device and to conduct wireless signals to the wireless communication device; and connecting the at least one of the antenna device and stimulating device to the wireless communication device. Other embodiments of this aspect include corresponding systems and apparatus.

Particular embodiments of the subject matter described in this specification can be implemented to realize one or more of the following advantages. Various implementations provide remote access to components and controls of the wireless communication device (i.e., the wireless controller) external to the housing in which the wireless communication device is placed or enclosed. This remote access to the wireless communication device prevents having to open or otherwise disassemble the housing to access the wireless communication device, which can be challenging given the type of housing and the manner in which the housing is mounted. Remote access to the wireless communication device can include, for example, access to a stimulating device that, upon actuation, causes the wireless communication device to perform an action such as resetting or joining a network; access to a visual indicator that provides information about the status or operation of the wireless communication device; and access to an antenna connection to the wireless communication device.

Providing an antenna or an antenna connection for the wireless communication device external to the housing increases the wireless communication device's effectiveness at sending and receiving messages as the antenna can be mounted outside of the housing to avoid the RF signal attenuating effects that result by mounting the antenna inside the housing.

Various implementations utilize existing knockouts in the housing to mount the plate or assembly carrying the stimulating device, visual indicator and/or antenna connection (or antenna) to facilitate the assembly and installation of the housings and wireless communication devices. This reduces or eliminates the need, for example, to drill or punch holes in the housing to access the wireless communication device, run wires out of the housings from the wireless communication device and/or separately mount wireless communication device components on the housing, and simplifies the manufacturing process.

Further, in some cases, the plate assembly can seal the knockouts and protect the housing against water/moisture and/or dust. The plate assembly can therefore be used with IP-rated housings (such as IP-56 housings) and permit these housings to maintain their IP-rating.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes an apparatus and method for providing access to components and controls of a wireless communication device external to the housing in which the wireless communication device is enclosed so that these components and controls can be accessed without opening or disassembling the housing.

Many housings (e.g., lighting fixtures and junction boxes) include a knockout that provides an opening to the interior of the housing after removal of a knockout blank from the knockout hole. Knockouts are typically coupled to conduits and pipes to allow electrical wires to be run into and out of housings safely, and are typically standardized around specific sizes to ensure interworking between housings, conduits and pipes. In some implementations, a plate assembly is provided that utilizes the opening in the knockout hole, after the knockout blank has been removed, to provide remote access to certain components and controls of the wireless communication device external to the housing (e.g., provide remote access to the components and controls on or at the exterior of the housing). For example, the plate assembly can engage or otherwise attach to the housing at the knockout and can include components on the exterior side of the plate assembly, accessible outside of the housing, that are connected to the wireless communication device inside the housing.

The components on the exterior side of the assembly connected to the wireless communication device can include, for example, a stimulating device (e.g., a button, switch or other touch sensitive device) to cause the wireless communication device to perform a particular operation (e.g., reset), an antenna or an antenna connector to locate the antenna for the wireless communication device outside of the housing and/or a visual indicator (e.g., an LED) to provide information about the status or operation of the wireless communication device. In this manner the plate assembly provides remote access (e.g., access external to the housing) to various components and controls of the wireless communication device by leveraging the existing knockouts in the housing. These implementations, and additional aspects, are described in more detail below.

A plate assembly engages to a knockout hole in a housing after removal of a knockout blank from the knockout hole. The housing is, for example, a lighting fixture or a junction box. The housing includes one or more knockout holes covered by knockout blanks that can be removed (e.g., by punching or "knocking out" the knockout blank from the knockout hole) to provide an opening into or an access point to the interior region of the housing. The knockout holes can be used, for example, to allow wires and other connections to pass from the outside of the housing into the interior of the housing to connect to devices enclosed in the housing. For example, many lighting fixtures include one or more circular knockout holes having diameters of ⅞-inch, which can be used to pass electrical wires to ballasts and other devices (e.g., wireless communication devices) enclosed in the housing.

Figure 1A:
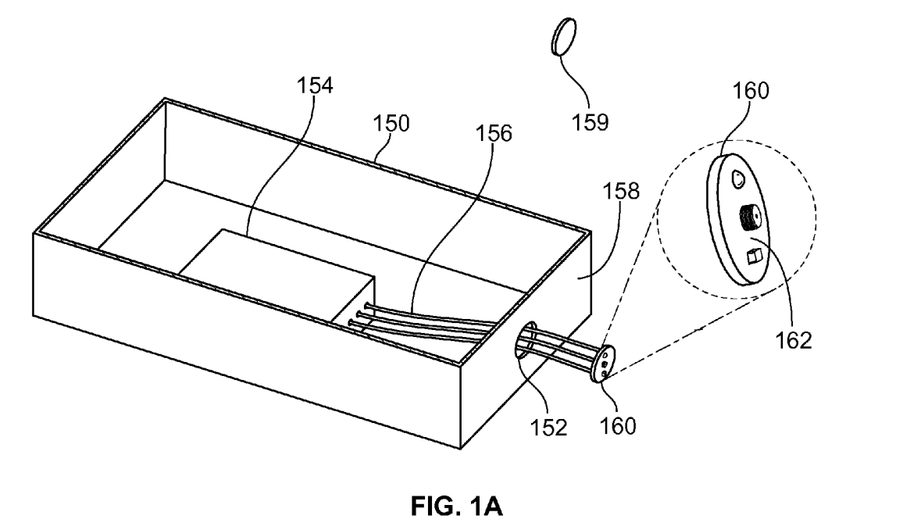
FIG. 1A depicts an example housing with a knockout hole.

Knockout holes can be industry standard sizes or shapes, and can also be custom sizes or shapes. More generally, knockouts are access points in the exterior of the housing to access the interior region of the housing. The plate assembly and knockouts are further described with reference to FIG. 1A, which depicts an example housing with a knockout hole 152. For illustrative purposes, FIG. 1A depicts a cutaway view of the housing 150 (e.g., a view of the housing 150 with the top portion of the housing 150 removed to provide a view into the interior region of the housing 150).

The housing 150 is used to enclose or house, for example, electrical or mechanical devices. For example, housing 150 is a lighting fixture 150 enclosing a ballast, driver or striker (not shown) and a wireless communication device 154 connected (e.g., wired) to the ballast, driver or striker to provide wireless functionality to the ballast, driver or striker. For example, the wireless communication device 154 receives wireless communications that cause it to take action on the ballast/striker/driver (such as turning the ballast/driver/striker on or off, or to dim it to a specific level) and send wireless communications based on information from or about the ballast/striker/driver (such as the power consumed by ballast/striker/driver or the state it has placed the ballast/striker/driver into). By way of another example, the housing is a lighting fixture and the wireless communication device is a wireless ballast/driver/striker which provides ballast/driver/striker functionality and has a radio integrated within it. Thus the wireless communication device 154 is a device capable of receiving wireless communications, transmitting wireless communications, or both.

The housing 150 includes a knockout hole 152. The knockout hole 152 provides an opening to the interior region of the housing 150 after the knockout blank 159 has been removed from the knockout hole 152. The knockout hole 152 allows wires or other connections to devices within the housing 150 to be connected to devices external to the housing 150. For example, the knockout hole 152 allows wires 156 connected to the wireless communication device 154 to pass through an exterior surface 158 of the housing 150 to connect to the plate assembly. In some implementations, the plate assembly includes a coupling device (not shown) and a plate 160. The coupling device is engaged to the knockout hole 152 or more generally to the housing 150, and is further described below with reference to FIGS. 2A, 2B, 2C and 2D.

The plate 160 is engaged to the coupling device. The plate 160 is of dimensions to at least substantially cover uncovered portions of the knockout hole 152 when the coupling device is engaged with the knockout hole 152. For example, when the coupling device is engaged to the knockout hole 152 and the plate 160 is engaged to coupling device, the plate 160 covers or substantially covers the knockout hole 152. In some implementations, the plate 160 and coupling device covers or substantially covers the knockout hole 152 to prevent moisture, debris or other particles from entering the housing 150 through the knockout hole 152, which could be detrimental to the operation of devices within the housing 150. Further, the plate assembly can be configured to achieve or maintain an IP rating (Ingress Protection rating) for the housing 150.

In some implementations, the plate 160 is engaged to the coupling device such that the plate 160 is disposed on or proximate to the exterior surface 158 of the housing 150. This plate 160 arrangement defines an exterior plate surface 162 that faces away from the housing 150 when the plate assembly is engaged to the knockout hole 152. In other words, after the plate assembly is engaged to the knockout hole 152, the plate 160 is positioned such that it is flush or nearly flush with the exterior surface 158 and has an exterior plate surface 162 that is oriented away from the interior of the housing 150. However, in other implementations, the plate 160 can be positioned (e.g., engaged to the coupling device) such that the plate 160 is offset from the exterior surface 158. For example, the plate 160 is positioned such that it outside of the interior region of the housing 150 and a certain distance away from or "off" the exterior surface 158. As described below, such an offset may be utilized to improve the transmission of communications from, for example, the wireless communication device 154, the reception of communications by the wireless communication device 154 or both. The plate 160 is further described with reference to FIG. 1B, which depicts an example plate 160.

Figure 1B:
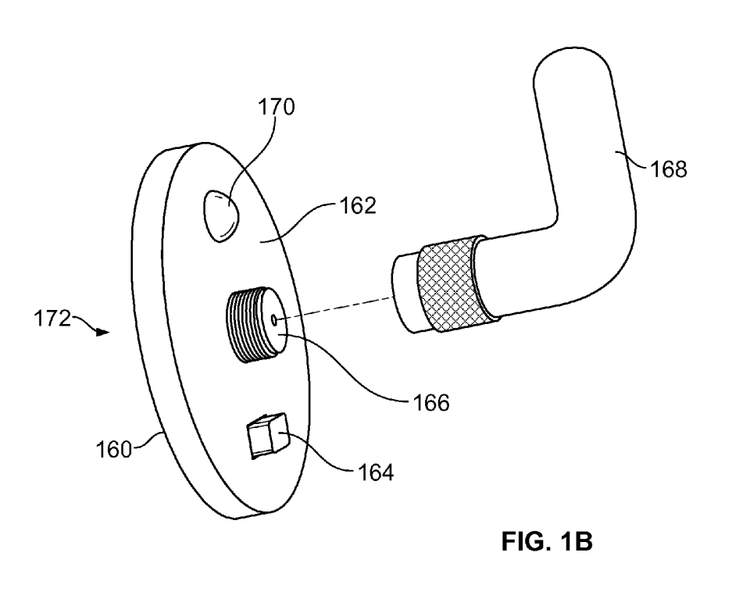
FIG. 1B depicts an example plate.

In some implementations, the plate 160 includes a stimulating device 164. The stimulating device is an apparatus that upon actuation (or stimulus) causes a response from the device or component to which the stimulating device is connected. For example, the stimulating device can be a button or a switch. The stimulating device 164 is positioned on the exterior plate surface 162 of the plate 160. In some implementation, the stimulating device 164 is adapted to connect to the wireless communication device 154 and, upon actuation of the stimulating device 164, cause the wireless communication device 154 to perform one or more predefined operations. For example, the predefined operations include setting the wireless communication device 154 to factory default settings (e.g., resetting the wireless communication device 154) or causing the wireless communication device 154 to join a wireless network.

In some implementations, the plate 160 includes an antenna device 166. The antenna device 166 is a device that connects to an antenna (e.g., antenna 168) and provides a transmission path to and from a communication device to the antenna. In some implementations, the antenna device includes the antenna (e.g., a chip antenna). The antenna device can be or includes, for example, an N connector or an SMA connector. The antenna device 166 is positioned on the exterior plate surface 162 of the plate 160. In some implementations, the antenna device 166 is adapted to connect to the wireless communication device 154 and to conduct signals or communications received through an antenna connected to the antenna device 166 to the wireless communication device 154. Similarly, the antenna device 166 can conduct signals or communications generated by the wireless communication device 154 to the antenna for transmission. However, as described above, in some implementations, the antenna device 166 includes the antenna.

In some implementations, the plate 160 includes a message indicator 170. The message indicator 170 is a device that provides indications of events, communications from, or a status of a device to which the message indicator is connected. The message indicator 170 can be, for example, an LED or other device that provides visual indications. The message indicator 170 can also be a device that provides audible or tactile indications from the device to which it is connected (e.g., a speaker or vibrator). The message indicator 170 is positioned on the exterior plate surface 162 of the plate 160. In some implementations, the message indicator 170 is adapted to connect to the wireless communication device 154 and to provide indications of messages from the wireless communication device 154, a status of the wireless communication device 154 or both.

In some implementations, interior plate connectors (not shown) are positioned on the interior plate surface 172 (i.e., the plate surface opposite the exterior plate surface 162) and connect to the stimulating device 164, the antenna device 166 and/or the message indicator 170, for example, through one or more apertures in the plate 160. In some implementations, the apertures can be vias or other passages through the plate 160 that allow wires or other conductors to connect the stimulating device 164, the antenna device 166 and/or the message indicator 170 to the interior plate connectors. In this way, for example, connections from the wireless communication device 154 (e.g., wires or cables) can be connected to the stimulating device 164, the antenna device 166 and/or the message indicator 170 through the interior plate connections and the apertures. Utilizing the interior plate connectors and the apertures allows the wireless communication device 154 to connect to the stimulating device 164, the antenna device 166 and/or the message indicator 170 while allowing the plate assembly to cover or substantially cover the knockout hole 152 (as the connections can pass through the plate assembly). However, in other implementations the connections from the wireless communication device 154 can pass through a gap between the knockout hole 152 and the plate assembly (or other opening in the exterior of the housing 150) and connect to the stimulating device 164, the antenna device 166 and/or the message indicator 170 at the exterior plate surface 162.

Although, only the stimulating device 164, the antenna device 166 and the message indicator 170 have been described as being portions of the plate assembly, the plate assembly can provide features to control or otherwise access other wireless communication device 154 components.

As described above, the plate assembly includes a coupling device that is adapted to engage to the knockout hole 152, and to which the plate 160 engages. In some implementations the plate 160 is removably engaged to the coupling device such that it can be engaged to and disengaged from the coupling device. The coupling device is further described with reference to FIGS. 2A, 2B, 2C and 2D.

Figure 2A:
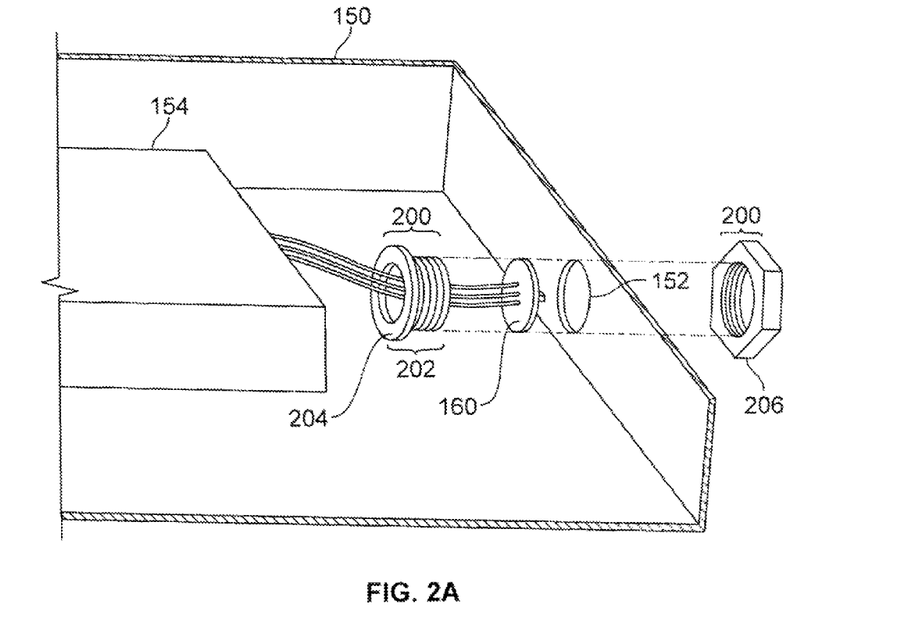
FIG. 2A depicts an example coupling device.

FIG. 2A depicts an example coupling device 200. In some implementations, the coupling device 200 is removably engaged to the knockout hole 152 (or, more generally, the housing 150) so that it can readily be engaged and disengaged from the knockout hole 152. In some implementations, the coupling device 200 includes a threaded portion 202 that engages to the knockout hole 152 by being inserted from the interior region of the housing 150 through the knockout hole 152. The threaded portion 202 can include a backing 204 that has dimensions sufficient to prevent the threaded portion 202 from passing all the way through the knockout hole 152. For example, the backing 204 has a diameter greater than that of the knockout hole 152 so that only a portion of the threaded portion 202 can pass through the knockout hole 152 and extend beyond the housing 150. The coupling device 150 also includes a fastener portion 206 (e.g., a nut) that can be connected to the threaded portion 202 after the threaded portion 202 is inserted into and through the knockout hole 152. For example, the threaded portion 202 can be inserted through and extend beyond the knockout hole 152 such that the fastener portion 206, having a diameter greater than that of the knockout hole 152, screws on (or otherwise engages) to the portion of the threaded portion 202 that extends beyond the knockout hole 152.

In some implementations, the plate 160 can engage the coupling 200 between the threaded portion 202 and the fastener 206. For example, the threaded portion 202 (including the backing 204) can have an opening through its longitudinal axis (i.e., the axis perpendicular to the plane containing the knockout hole 152) and the plate 160 can be positioned inside the opening in the threaded portion 202 and rest against the backing 204. The plate 160, for example, has a diameter smaller than that of the interior diameter of the backing 204 to prevent the plate 160 from slipping out through the backing 204 into the interior region of the housing 150. The opening in the threaded portion 202 also allows connections to pass through the threaded portion 202 and connect to the plate 160. Thus the plate 160 can be positioned inside the threaded portion 202 (e.g., engaged to the coupling 200), the threaded portion 202 can be inserted into the knockout hole 152 and, from the exterior of the housing 150, the fastener 206 can be engaged (e.g., screwed on) to the threaded portion 202 to secure the plate assembly to the knockout hole 152. However, in some implementations, the threaded portion 202 can initially be positioned external to the housing 150 and inserted into the knockout hole 152 into the interior of the housing 150 and, from the interior of the housing 150, the fastener 206 can be engaged to the threaded portion 202 to secure the plate assembly to the knockout hole 152.

Figure 2B:
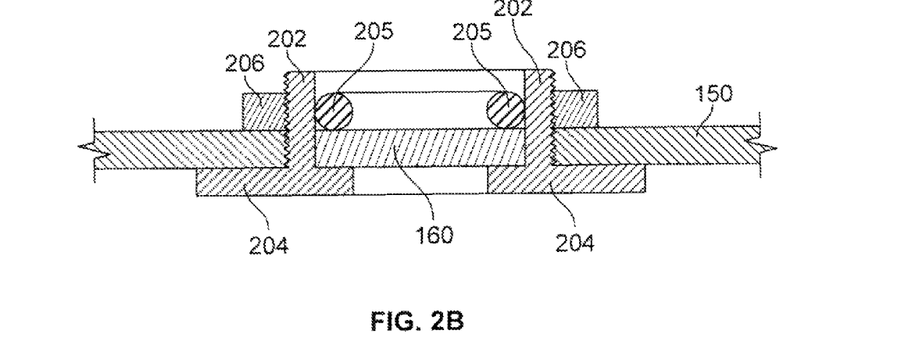
FIG. 2B depicts an example restraining device.
Figure 2C:
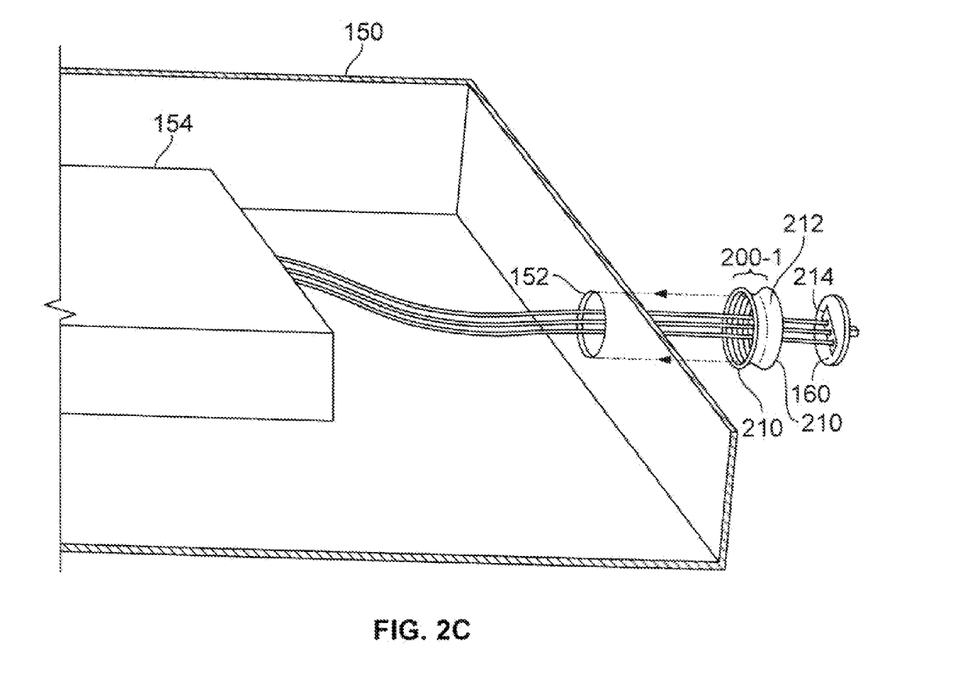
FIG. 2C depicts another example coupling device.

In some implementations, a restraining device is used to restrain the plate 160 to the coupling device 200. FIG. 2B depicts an example restraining device 205. Particularly, FIG. 2B is a cross-sectional view of an example restraining device 205 positioned in a coupling device 200. The restraining device 205 is inserted into the opening in the threaded portion 202 and placed against the plate 160 after the plate 160 has been positioned against the backing 204 to restrain the plate 160 from sliding out the front side of the threaded portion (i.e., the side of the threaded portion 202 opposite the backing 204 and to which the plate 160 is inserted). For example, the restraining device 205 can be a rubber gasket or seal. Other types of coupling devices 200 can also be used. For example, FIG. 2C depicts another example coupling device 200.

In some implementations, the coupling device 200 is a resilient gasket or seal 200-1 (e.g., rubber grommet). The seal 200-1 has side walls 210, a center portion 212 between the side walls 210 and an opening that passes through the entirety of the seal 200-1. The side walls 210 have a greater diameter (or circumference) than that of the center portion 212 and that of the knockout hole 152. The seal 200-1 engages the knockout hole 152 by being temporarily deformed to allow one side wall 210 to be inserted into the knockout hole 152 and then allowing the deformed side wall 210 to assume its previous shape. Thus after engagement of the seal 200-1 to the knockout hole 152, one side wall 210 is in the interior region of the housing 150 and the other side wall 210 is outside of the housing 150 with the center portion 212 aligned with the knockout hole 152. The center portion 212 can include grooves or other features that accept and hold the plate 160 after the plate has been engaged (e.g., inserted) into the center portion 212. The plate 160 can be engaged and disengaged from the seal 200-1, for example, by snapping the plate 160 into and unsnapping the plate 160, respectively, from the grooves in the center portion 212 (e.g., the plate 160 is removably engaged to the seal 200-1). The opening in the seal 200-1 allows connections, for example, from the wireless communication device 154 to connect to the interior plate connectors 214 on the plate 160.

Figure 2D:
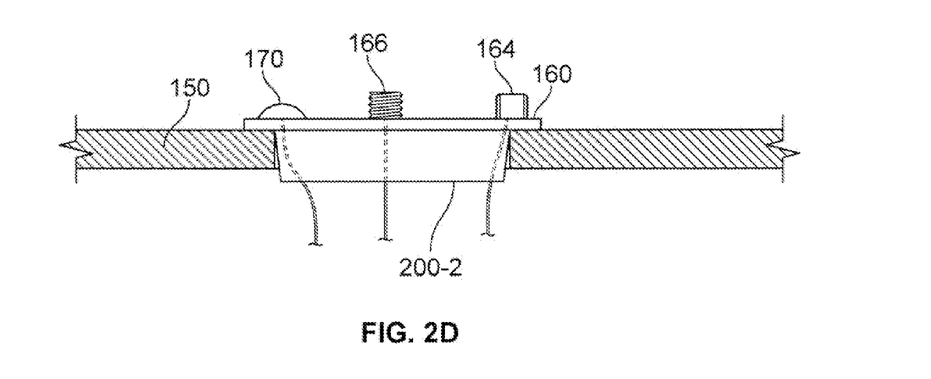
FIG. 2D depicts yet another example coupling device.

FIG. 2D depicts yet another example coupling device 200. In some implementations, the coupling device 200 is a friction fit plug 200-2. The plug 200-2 can have a tapered shape such that the further the plug 200-2 is inserted into the knockout hole 152 the more securely it is engaged to the housing 150, given the increasing diameter (or circumference) of the plug 200-2 along its longitudinal axis. In some implementations, the plug 200-2 is inserted into to the knockout hole 152 from outside the housing 150 such that that smallest diameter portion of the plug 200-2 is inserted first into the knockout hole 152 and pressed into the knockout hole 152 until the increasing diameter (or circumference) the plug 200-2 causes a secure engagement.

As shown in FIG. 2D, the plate 160 is engaged to the plug 200-2 proximate the end portion of the plug 200-2 with the largest diameter (or circumference). The plate 160 can be engaged to the plug 200-2 by any well-known attachment method such as, for example, by an adhesive. The plug 200-2 has openings of other passages along its longitudinal axis that allow connections, for example, from the wireless communication device 154 to pass through the plug 200-2 and connect to the plate 160 (and components on the plate 160 such as the stimulating device 164).

Another example coupling device 200 includes springloaded latches. For example, the portion of the coupling device 200 that is inserted into the knockout hole 152 includes latches that are depressed as the coupling device 200 is inserted into the knockout hole 152 and un-compress after that end of the coupling device 200 is through the knockout hole 152. The uncompressed latches prevent the coupling device 200 from being pulled back out through the knockout hole 152 without first re-depressing the latches (e.g., the uncompressed latches result in the coupling device 200 have a diameter greater than that of the knockout hole 152). In some implementations, the coupling device 200 can be inserted into the knockout hole 152 from the interior of the housing 150 and in other implementations can be inserted into the knockout hole 152 from the exterior side of the housing 150.

In some implementations, the plate 160 and coupling device 200 can be separate elements. However, in other implementations the plate 160 and coupling device 200 can be an integrated element or portions of the same element. For example, the plate 160 and coupling 200 can be cast from a single mold or can be otherwise joined in a permanent or semi-permanent manner.

Figure 3:
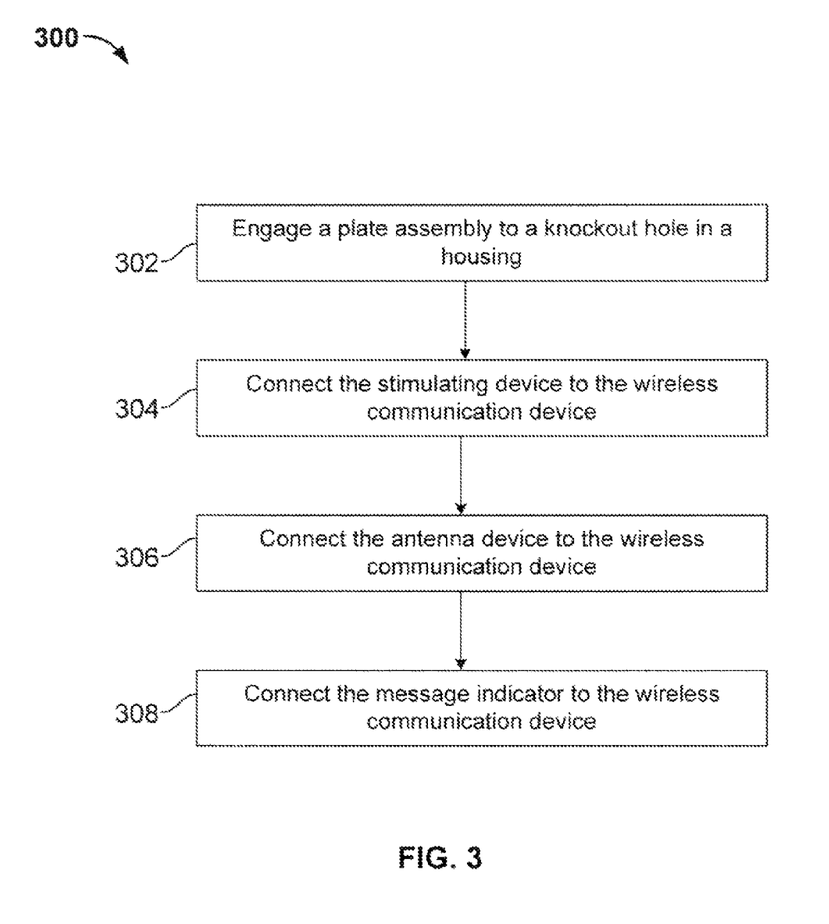
FIG. 3 is a flow diagram of an example process for engaging a plate assembly to a housing.

FIG. 3 is a flow diagram of an example process 300 for engaging a plate assembly to a housing.

A plate assembly engages to a knockout hole in a housing after removal of a knockout blank from the knockout hole (302). For example, the plate assembly, described above with reference to FIGS. 1A and 1B, engages a knockout hole 152 in the housing 150 after removal of a knockout blank from the knockout hole 152.

The stimulating device is connected to the wireless communication device (304). In some implementations, the stimulating device 164 is directly connected from the plate 160 to the wireless communication device 154 by connections originating from the wireless communication device 154. In such implementations, the length of the connections from the wireless communication device 154 may limit or otherwise dictate the placement of the plate assembly.

In other implementations, the wireless communication device 154 includes or connects to an intermediate connection device such as a terminal block and the stimulating device 164 connects to the wireless communication device 154 through the intermediate connection device (or intermediate connection devices).

The antenna device is connected to the wireless communication device (306). In some implementations, the antenna device 166 is directly connected from the plate 160 to the wireless communication device 154 by connections originating from the wireless communication device 154. As with the stimulating device 164, in such implementations, the length of the connections from the wireless communication device 154 may limit or otherwise dictate the placement of the plate assembly.

In other implementations, the wireless communication device 154 includes or connects to an intermediate connection device such as an antenna jack and the antenna device 166 connects to the wireless communication device 154 through the intermediate connection device (or intermediate connection devices).

The message indicator is connected to the wireless communication device (308). In some implementations, the message indicator 170 is directly connected from the plate 160 to the wireless communication device 154 by connections originating from the wireless communication device 154. As with the stimulating device 164 and antenna device 166, in such implementations, the length of the connections from the wireless communication device 154 may limit or otherwise dictate the placement of the plate assembly.

In other implementations, the wireless communication device 154 includes or connects to an intermediate connection device such as a terminal block and the message indicator 170 connects to the wireless communication device 154 through the intermediate connection device (or intermediate connection devices).

The modularity of the plate assembly allows the plate assembly to be installed on a housing 150 on-site in the field, or assembled with the housing 150 during the manufacturing of the housing 150. The housing 150 with the pre-installed plate assembly can then be installed in the on-site. In either scenario, as most housings 150 have multiple knockouts on various sides of the housings 150, the plate assembly can be engaged to a housing on the side or top of the housing 150. In such an installation, if the housing 150 is a ceiling-installed lighting fixture, the installer may have to remove ceiling tiles to access the knockout hole to install the plate assembly. For installations in which the knockout is on the bottom of the lighting fixture, no such tile removal is necessary to install or subsequently access the plate assembly.

Figure 4:
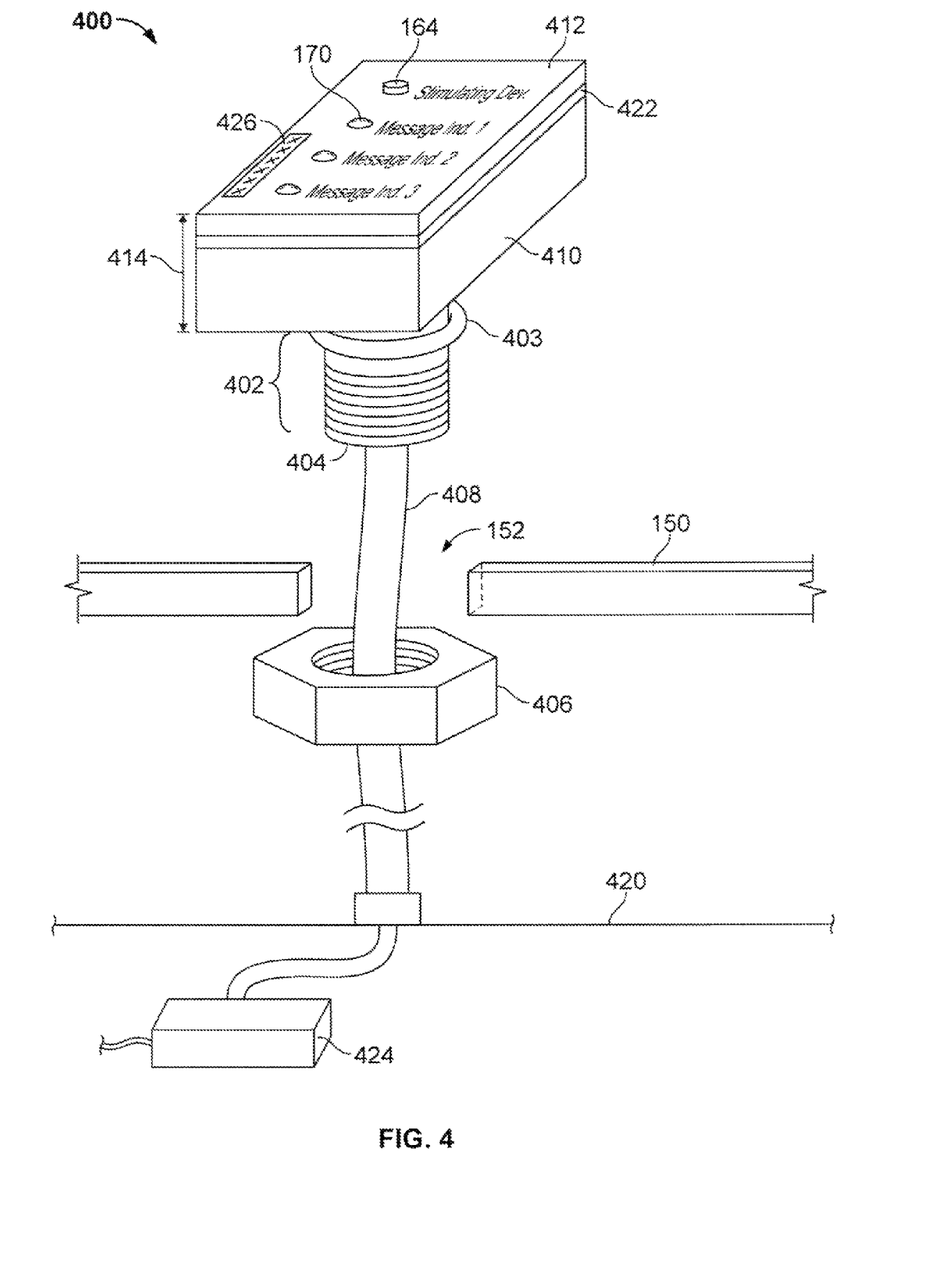
FIG. 4 depicts an example wireless communication device assembly.

As described above, the plate assembly (e.g., the plate 160 and coupling device 200) allows remote access to certain components and controls of the wireless communication device 154. However, instead of providing remote access to these components and controls, a wireless communication device assembly can be provided to allow more direct access to these components and controls. FIG. 4 depicts an example wireless communication device assembly 400, which allows such access.

The wireless communication device assembly 400 is a device that includes some or all of the features and functions of the wireless communication device 154 and the plate assembly. The wireless communication device assembly 400 is adapted to engage the knockout hole 152 in a housing 150 after removal of the knockout blank from the knockout hole 152. The wireless communication device assembly 400 can be connected to a base unit 420 within the housing 150. The base unit 420 can be, for example, a ballast/striker/driver, a wireless communication device 154, both, or a device with some features and functionality of either or both. The wireless communication device assembly 400 can include a connection 408 (or multiple connections 408) that connects the wireless communication device assembly 400 to the base unit 420. The connection 408 can be, for example, an RJ connector, such as a telephone wire (RJ-11) or a Ethernet connector (RJ-45).

In some implementations, the base unit 420 includes a relay 424. The relay 424 is a control device that controls the operation of a load (not shown) within or partially within the housing 150. For example, the load can be a lighting fixture and the relay can control the operation of the lighting fixture (e.g., turn lights on/off through the lighting fixture's ballast/striker/driver). The relay 424 (or base unit 420 more generally) can be actuated or otherwise controlled based on instructions in wireless communications received by the wireless communication device assembly 400 and communicated to the relay 424 (or base unit 420). In some scenarios, the instructions can be provided by an energy control management system managing the operation of the load.

The base unit 420 can also include a dimming interface (not shown) to, for example, interface with a ballast or driver of a lighting fixture. The dimming interface is a control device that, based on a variable input, causes the luminescence from a lighting fixture to vary in relation to the variable input. For example, the dimming interface can be a wire-pair interface (e.g., 0-10V wire-pair). Similarly to the relay 424, instructions (e.g., the variable input) in wireless communications received by the wireless communication device assembly 400 can be communicated to the dimming interface to control the luminescence from the lighting fixture. In some scenarios, the instructions can be provided by an energy control management system managing the operation of the lighting fixture.

In some implementations, the wireless communication device assembly 400 includes a housing engagement portion 402 that has dimensions to at least substantially cover any uncovered portions of the knockout hole 152 when the wireless communication device assembly 400 is engaged with the knockout hole 152. For example, the housing engagement portion 402 has a threaded end portion 404 and the threaded end portion 404 extends into the interior region of the housing 150 when the wireless communication device assembly 400 is engaged to the knockout hole 152. After the wireless communication device assembly 400 is engaged to the knockout hole 152 a fastener 406 (e.g., nut) can engage the threaded end portion 404 in the interior region of the housing 150 to secure the wireless communication device assembly 400 to the housing 150.

In some implementations, the wireless communication device assembly 400 includes a sealing apparatus 403 such as, for example, an o-ring gasket or a compliant washer. The sealing apparatus 403 is positioned on (e.g., around) the housing engagement portion 402 such that when the fastener 406 engages the threaded end portion 404 and secures the wireless communication device assembly 400 to the housing 150 (e.g., by tightening the fastener 406), the sealing apparatus 403 is compressed (or in compression) between the wireless communication device assembly 400 and the housing 150 around the perimeter of the knockout hole 152. In this way, the sealing apparatus 403 creates a seal (e.g., a full or partial seal) around the knockout hole 152, which can prevent, for example, debris or moisture from entering the housing 150 through the knockout hole 152 (e.g., in any gaps between the wireless communication device assembly 400 and the perimeter of the knockout hole 152).

The wireless communication device assembly 400 includes a remote unit portion 410. The remote unit 410 includes a radio and an antenna device 166 (not shown) to allow the wireless communication device assembly 400 to send and receive wireless communications. The remote unit portion 410 extends away from an exterior surface of the housing 150 and away from the housing engagement portion 402. Thus, in some implementations, the remote unit portion 410 is positioned outside of the housing 150 (e.g., to facilitate efficient wireless communication). However, in other implementations, the remote unit portion 410 is positioned inside the interior region of the housing 150 such that only the remote unit surface 412 or a portion of the remote unit surface 412 is exposed through the knockout hole 152.

The remote unit portion 410 has a remote unit surface 412 distal from the housing engagement portion 402. For example, the remote unit surface 412 is the surface of the side of the remote unit portion 410 furthest from the housing 150. As described above, in some implementations, the remote unit portion 410 includes an antenna device 166 (e.g., a chip antenna) and the antenna device 166 is positioned proximate the remote unit surface 412. For example, the antenna device 166 can be a chip antenna positioned on a substrate 422 (e.g., circuit board) in the remote unit portion 410. To facilitate efficient transmission and reception of wireless communications, the depth 414 of the remote unit portion 410 and the placement of the antenna device 166 on or within the remote unit portion 410 are selected to provide a desired degree of RF isolation between the housing 150 and the antenna device 166. For example, the substrate 422 carrying the antenna device 166 can be positioned at a particular depth in the remote unit portion 410 such that when the wireless communication device 400 is engaged to the housing 150, the distance between the exterior of the housing 150 and the antenna device 166 (set by the depth of the substrate 422 within the remote unit portion 410) is a desired distance (e.g., a distance that reduces or minimizes RF interference between the antenna device 166 and the housing 150.

In some implementations, the wireless communication device assembly 400 includes a stimulating device 164 positioned on or near the remote unit surface 412. Actuation of the stimulating device 164 causes the base unit 420 (or the wireless communication device assembly 400 or both) to perform one or more predefined operations. For example, actuating the stimulating device 164 causes the wireless communication device assembly 400 to reset to factory default settings.

The wireless communication device assembly 400 can also include a message indicator 170 (or multiple message indicators 170) positioned on the remote unit surface 412 and adapted to provide indications of messages from the base unit 420 (or from the wireless communication device assembly 400 itself). For example, the message indicator 170 can indicate a status of the base unit 420 or wireless communication device assembly 400. The wireless communication device assembly 400 can provide access to other well-known wireless system components and control as well. For example, the wireless communication device assembly 400 can report error messages from the base unit 420 (e.g., via a message indicator 170) or power consumption values of the base unit 420 (e.g., and wirelessly report the values to a central control system).

In some implementations, the wireless communication device assembly 400 includes an identifier 426. The identifier 426 is a unique or quasi-unique identifier of the wireless communication device assembly 400 (e.g., alphanumeric characters, bar code or both). The identifier 426 (e.g., a label or tag with the unique identification for the assembly 400) is positioned on the wireless communication device assembly 400 such that after the wireless communication device assembly 400 has been engaged to the housing 150, the identifier 426 is external to the housing and visible without opening or disassembling the housing 150. For example, the identifier 426 is positioned on the remote unit surface 412.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus, comprising:
   a coupling device that engages a knockout hole in a lighting fixture housing after removal of a knockout blank from the knockout hole, the housing defining exterior surfaces and an interior region;
   a plate coupled to the coupling device, the plate being of dimensions to at least substantially cover uncovered portions of the knockout hole when the coupling device is engaged with the knockout hole and to be disposed on an exterior surface of the housing and defining an exterior plate surface; and
   an antenna device positioned on the exterior plate surface of the housing, wherein the antenna device, when connected to a wireless communication device housed within the interior region of the housing, conducts wireless signals to the wireless communication device.

2. The apparatus of claim 1, wherein the plate comprises an aperture and the antenna device, when connected to the wireless communication device, connects to the wireless communication device through the aperture.

3. The apparatus of claim 1, further comprising:
a message indicator positioned on the exterior plate surface, the message indicator, when connected to the wireless communication device, provides indications of messages from the wireless communication device.

4. The apparatus of claim 1, wherein the coupling device is a rubber friction fit plug.

5. The apparatus of claim 1, wherein the coupling device comprises a spring-loaded latch device.

6. The apparatus of claim 1, wherein the apparatus comprises the wireless communication device and the wireless communication device is coupled to the plate through the knockout hole.

7. The apparatus of claim 1, wherein the plate is removably coupled to the coupling device.

8. The apparatus of claim 1, wherein the lighting fixture housing includes one of a ballast for a fluorescent lighting fixture, a driver for an LED lighting fixture, or a striker for an HID lighting fixture.

9. A method comprising:
engaging a plate assembly to a knockout hole in a light fixture housing after removal of a knockout blank from the knockout hole, the lighting fixture housing defining exterior surfaces and an interior region, wherein the plate assembly comprises:
a coupling device that engages the knockout hole;
a plate coupled to the coupling device, the plate being of dimensions to at least substantially cover uncovered portions of the knockout hole when the coupling device is engaged with the knockout hole and to be disposed on an exterior surface of the housing and defining an exterior plate surface; and
an antenna device positioned on the exterior plate surface, wherein the antenna device connects to a wireless communication device housed within the interior region of the lighting fixture housing and conducts wireless signals to the wireless communication device; and
connecting the antenna device to the wireless communication device.

10. The method of claim 9, further comprising:
removing the knockout blank from the knockout hole in a housing.

11. The method of claim 9, wherein the plate comprises an aperture and the antenna device is connected to the wireless communication device through the aperture.

12. The method of claim 9, wherein the plate assembly further comprises a message indicator positioned on the exterior plate surface, wherein the message indicator connects to the wireless communication device and provides indications of messages from the wireless communication device, the method further comprising:
connecting the message indicator to the wireless communication device.

13. An apparatus, comprising:
a wireless communication device assembly that engages a knockout hole in a lighting fixture housing after removal of a knockout blank from the knockout hole, the housing defining exterior surfaces and an interior region housing a base unit, the wireless communication device assembly comprising:
a housing engagement portion being of dimensions to at least substantially cover any uncovered portions of the knockout hole when the wireless communication device assembly is engaged with the knockout hole;
a remote unit portion positioned outside of the housing when the wireless communication device assembly is engaged with the knockout hole, the remote unit portion having a remote unit surface distal from the housing engagement portion; and
an antenna device to receive wireless communications that include instructions for the base unit.

14. The apparatus of claim 13, wherein the wireless communication device assembly further comprises:
a message indicator positioned on the remote unit surface to provide indications of messages from the base unit.

15. The apparatus of claim 13, wherein the antenna device is positioned within the remote unit portion at a specified position to cause the antenna device to be a specified distance from the housing when the wireless communication device assembly is engaged with the knockout hole.

16. The apparatus of claim 13, wherein the housing engagement portion has a threaded end portion and the threaded end portion extends into the interior region of the housing.

17. The apparatus of claim 16, wherein the wireless communication device assembly further comprises a sealing apparatus engaged to the housing engagement portion proximate the remote unit portion, wherein the sealing apparatus creates a seal around the knockout hole when the wireless communication device assembly is engaged with the knockout hole.

18. The apparatus of claim 13, wherein the base unit includes a relay to control the operation of a load at least partially within the housing.

19. A system comprising:
a means for engaging a wireless communication device assembly to a knockout hole in a lighting fixture housing after removal of a knockout blank from the knockout hole, the housing defining exterior surfaces and an interior region housing a base unit, the wireless communication device assembly comprising:
a housing engagement portion being of dimensions to at least substantially cover any uncovered portions of the knockout hole when the wireless communication device assembly is engaged with the knockout hole;
a remote unit portion positioned outside of the housing when the wireless communication device assembly is engaged with the knockout hole, the remote unit portion having a remote unit surface distal from the housing engagement portion; and at least one of:
an antenna device to receive wireless communications; and
a stimulating device positioned on the remote unit surface that upon actuation of the stimulating device causes the base unit to perform one or more predefined operations; and
a means for connecting the wireless communication device assembly to the base unit.

20. The system of claim 19, wherein the wireless communication device assembly further comprises:
a message indicator positioned on the remote unit surface to connect to the base unit and to provide indications of messages from the base unit.

* * * * *

UNITED STATES PATENT AND TRADEMARK OFFICE
CERTIFICATE OF CORRECTION

| | | |
|---|---|---|
| PATENT NO. | : 8,766,799 B2 | Page 1 of 1 |
| APPLICATION NO. | : 13/327248 | |
| DATED | : July 1, 2014 | |
| INVENTOR(S) | : Dean Russell Gray et al. | |

It is certified that error appears in the above-identified patent and that said Letters Patent is hereby corrected as shown below:

In the claims:

Claim 9, Column 13, Line 21 – delete "light" and insert -- lighting --, therefor.

Signed and Sealed this
Sixteenth Day of September, 2014

Michelle K. Lee
*Deputy Director of the United States Patent and Trademark Office*